United States Patent [19]

Nonoyama

[11] 4,131,719
[45] Dec. 26, 1978

[54] LOAD-BEARING SURFACE FOR A SOLENOID

[75] Inventor: Tikahiro Nonoyama, Aichi, Japan

[73] Assignee: Sanmeidenki Kabushikikaisha, Japan

[21] Appl. No.: 730,100

[22] Filed: Oct. 6, 1976

Related U.S. Application Data

[62] Division of Ser. No. 575,115, May 6, 1975, Pat. No. 4,002,283.

[30] Foreign Application Priority Data

Jun. 25, 1974 [JP] Japan .................................. 49-72581

[51] Int. Cl.² ............................................. H01F 7/06
[52] U.S. Cl. ................................ 428/598; 29/602 R; 335/261; 428/614; 428/638
[58] Field of Search ................ 228/112, 114; 335/249, 335/261, 277; 29/602; 428/594, 598, 614, 638

[56] References Cited

U.S. PATENT DOCUMENTS

| | | | |
|---|---|---|---|
| 2,803,790 | 8/1957 | Andrews | 335/261 X |
| 3,786,562 | 1/1974 | Ciszewski | 29/602 |
| 4,002,283 | 1/1977 | Nonoyama | 228/112 |

Primary Examiner—Donald G. Kelly
Assistant Examiner—K. J. Ramsey
Attorney, Agent, or Firm—William Anthony Drucker

[57] ABSTRACT

The load-bearing surface of a laminated plunger in a solenoid is provided with an embedded reinforcing material harder than the laminated plunger. The reinforcing material is made integral with the laminated plunger, by friction welding, only by a thin boundary layer between the contacting surfaces of the laminated plunger and the reinforcing material.

3 Claims, 6 Drawing Figures

LOAD-BEARING SURFACE FOR A SOLENOID

This is a division from my co-pending U.S. Pat. application Ser. No. 575,115 filed May 6th, 1975, now U.S. Pat. No. 4,002,283.

BACKGROUND OF THE INVENTION

This invention relates to a reinforced construction of load-bearing surface of the plunger in a solenoid.

The plunger in a solenoid is pulled by magnetic force toward the yoke of the solenoid. The pulled plunger moves instantaneously at a very high speed, and strikes against a load (the mating push-pin of a solenoid) with high impact. The load-bearing surface of the plunger is thus likely to be worn out and deformed. When a plunger is made of laminated silicon steel plates, the magnetic lines of force, and therefore the pulling force, are parallel with the laminated silicon steel plates. Although the silicon steel plates are assembled mechanically by means of caulking as a rigid member, each of them is thin, and weak in mechanical strength against a large impact applied parallel with the surface of the laminated plate. Thus, a solenoid including a laminated plunger is not durable for a long time. However, a solenoid may be required to ensure repeated operations of more than several hundred thousands or even several millions of times.

In order to prolong the life of a solenoid, a steel block, as a load-bearing member, is attached to the laminated plunger in a conventional solenoid. This steel block is embedded in a recess in the end surface of the laminated plunger, and is fixed therein by means of soldering. The plunger reinforced in this way requires many production operations, and the cost of manufacture of the solenoid becomes uneconomical. Further, if the steel block is shifted out of the plunger during the operation of the solenoid, or if the steel block is not in close contact with the laminated silicon steel plates, the magnetic resistance in the solenoid increases, thereby decreasing the reactance of the coil of the electromagnet and increasing the current in the coil. Thus, the coil then becomes heated to a high temperature. As an alternative method for reinforcing the laminated plunger, it has been proposed in the prior art to produce molten hard metal by means of electric welding and to pour it in the hollow of the laminated plunger. In this method, however, most of the laminated plunger becomes heated to a very high temperature, and the magnetic property of the laminated silicon steel plates, as well as the insulating quality of their oxide coating, is destroyed. Furthermore, blow holes often occur in the molten hard metal. These blow holes remain in the reinforcing member, provided by cooling the molten metal, and make the member weak in mechanical strength against impact. Thus, the percentage of faulty products, liable to give trouble in use, becomes extremely high.

SUMMARY OF THE INVENTION

An object of the present invention is to provide a load-bearing surface, of a solenoid, having remarkably high mechanical strength.

Another object of the present invention is to provide a load-bearing surface with a reinforcing material which is fastened and embedded in a recess in the end surface of the laminated plunger, the embedded surface of the reinforcing member being made integral with the inner surface of the recess.

Still another object of the present invention is to provide such a reinforced laminated plunger in the production of which the laminated silicon steel plates of the plunger are melted only at the inner surface of a recess made in the end surface of the plunger, and the inner surface is made integral with the embedded surface of a reinforcing material embedded in the recess, thermal damage to the laminated silicon steel plates, and resulting degradation of the magnetic property of the plunger, being avoided.

Still another object of the present invention is to provide a laminated plunger in which the laminated silicon steel plates are melted only to an extent which does not bring about degradation of the magnetic property, and which is restricted only to a thin boundary layer in contact with a reinforcing material embedded in the laminated silicon steel plates. The reinforcing material is integral with the steel plates only at a boundary layer, and the plates can thus receive a large impact applied parallel with the surface of the plates, and the plates remain secured in assembly even if the caulking, used for assembling the laminated silicon steel plates mechanically, becomes incomplete.

Other features and advantages of the invention will be apparent from the following description taken in conjunction with the accompanying drawings wherein.

Figure 1:
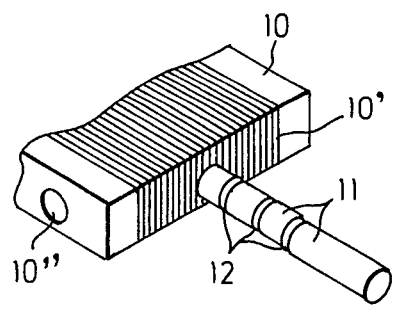
FIG. 1 is a perspective view showing a hard material and a member to be reinforced.
Figure 2:
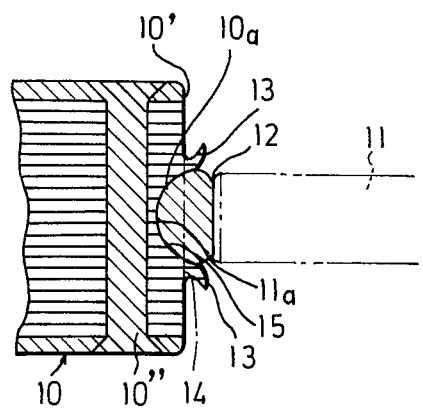
FIG. 2 is a view in section of the hard material and the member to be reinforced, after welding.

Reference numeral 10 indicates a plunger of an electromagnet taken as an example of a member to be reinforced, the plunger having been secured in assembled condition by a rivet 10″. This plunger has the function of driving a pin when it is used, for example, in an electromagnetic valve. It is composed mainly of laminated silicon steel plates. Numeral 10′ shows an end surface of the plunger, to be reinforced according to the present invention. Numeral 11 indicates a hard rod used as a reinforcing material. This rod member 11 is preferably harder than the plunger 10 to be reinforced. S.K.D.11, S.K.3, S.K.S.3 and materials equivalent to these are suitable for use as the material for this rod member 11. The rod 11 is provided with circular grooves 12 on its cylindrical surface at unit lengths, and units of the rod 11 are adapted to be broken off at these grooves.

Figure 3:
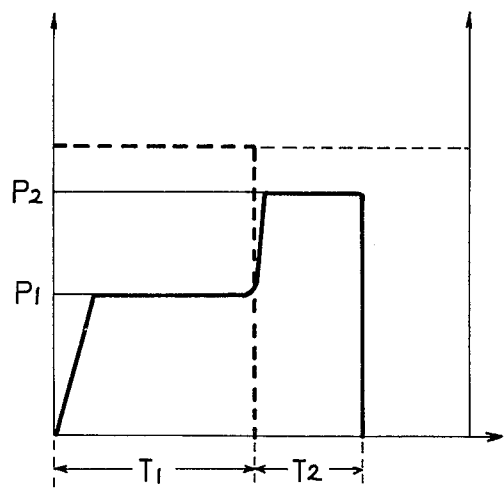
FIG. 3 is a graph showing welding pressure as a function of time.
Figure 4:
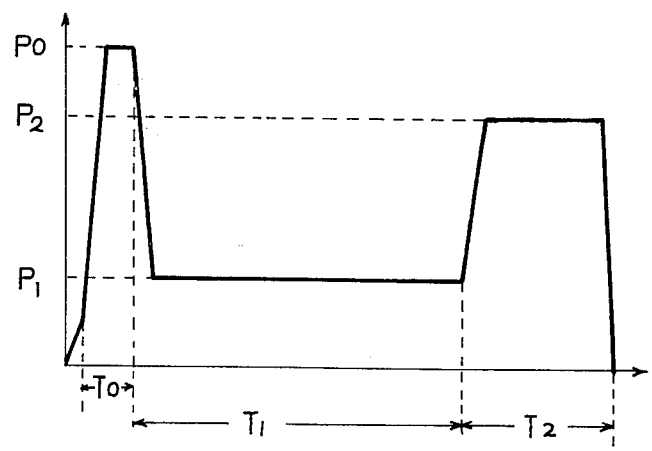
FIG. 4 is a graph similar to FIG. 3 but referring to another method of operation.
Figure 5:
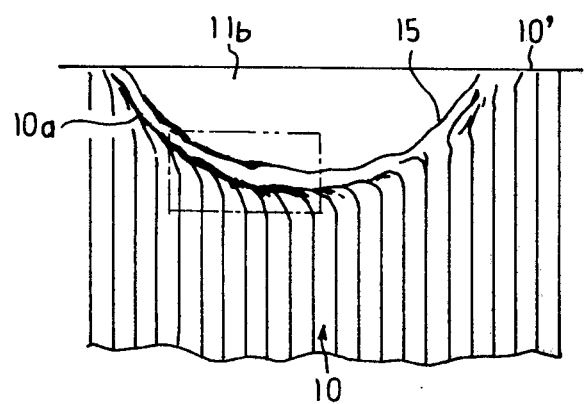
FIG. 5 is a view in section of the reinforced member, taken slightly off the centre of the welded portion.
Figure 6:
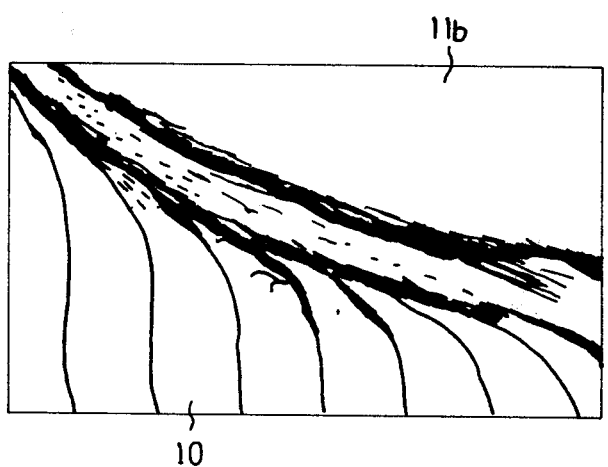
FIG. 6 is an enlarged fragmentary view of a portion shown within a chain-dotted line in FIG. 5.

The reinforced element is described with reference to the graph shown in FIG. 4. A rotary chuck adapted to hold the plunger 10, and a holder adapted to hold the hard rod 11 are set up so that the situation as shown in FIG. 1 may be established. This rotary chuck is rotatable, as is conventional in machine tools, and is constructed to be reciprocated by an oil pressure feed mechanism or other well known feed mechanism. The plunger 10 is advanced towards the hard rod 11 while the rotary chuck is rotated at a high speed (for example 3000–4000 r.p.m.). The end surface 10′ of the plunger 10 is brought into contact with the hard rod 11 and is advanced by the feed mechanism in a time interval $T_o$ (for example 0.7 seconds) under a high pressure, shown by $P_o$ in FIG. 4 such that the hard rod 11 can enter the plunger 10 and bears frictionally on the material thereof, (for example under a pressure of 25kg/mm$^2$) and thus the hard rod 11 penetrates into the plunger 10. Then, the pressure is reduced to such a value, shown by $P_1$, which is sufficient to heat and melt the contacting portions 10a and 11a by the heat generated at the contacting portions as a result of friction between the plunger 10 and the hard rod 11 (for example to a pressure of 6kg/mm$^2$). The reduced pressure situation is maintained for a suitable time interval, shown by $T_1$, (for example 5.5 seconds) and both contacting portions 10a and 11a are melted. After melting of these portions, the relative rotation is stopped and they are pressed towards each other under a pressure shown by $P_2$ which is sufficient to make the hard rod 11 push out the surrounding molten material and to force the hard rod 11 into the plunger (for example at a pressure of 17.5kg/mm$^2$) and this situation is maintained for a time interval shown by $T_2$, the plunger 10 and the hard rod 11 then adhering to each other. Cessation of the relative rotation may take place at a suitable instant before adhesion of the melted portions. The plunger having been welded for reinforcement is taken off the rotary chuck and the hard rod 11 is broken at the groove 12 nearest to the plunger 10. The rest of the piece of hard rod and a projection 13 formed as the result of the coagulation of the pushed out melted material are shaved off at a chain-dotted line 14 and necessary treatments such as hardening, polishing, rust-preventing treatment, and so on are carried out on the shaved-off surface. The cross-section of the reinforced portion 11b of the plunger 10 thus obtained shows that the material of the hard rod 11 is embedded in the material of the plunger 10, and both materials form a neat part-spherical boundary surface 15 without leaving blowholes or air gaps between them, which proves the good unification of the two materials. If the time interval $T_2$ is properly selected, it is possible to apply hardening treatment to the portion of the hard rod embedded in the plunger 10, e.g. quenching, without disturbing the constitution and the directional property of the embedded portion. It will be readily understood that even if the rotary chuck and the holder are reversed in their functions, i.e., if the plunger 10 is clamped by the securing vice and the hard rod 11 is rotated and advanced to obtain contact welding, the same result as in the embodiment just described is obtained. The pressures $P_o$, $P_1$, and $P_2$ and time intervals $T_o$, $T_1$, and $T_2$ are chosen according to the kinds of the member 10 to be reinforced and the hard rod 11, the thickness of the hard rod 11 and the length of the hard rod 11 to be embedded. The reinforcing work may be carried out under various different conditions and, for example, under a condition shown in FIG. 3.

I claim:
1. A plunger assembly, for a solenoid, comprising:
   (i) a plunger having a plurality of silicon steel plates secured together to form a laminated body with end edges of said plates exposed at a load-bearing face of said body, said load-bearing face having in it a recess the face of which is shaped as a body of revolution about an axis normal to the load-bearing face and having its greatest radial dimension coinciding with the load-bearing face
   (ii) a reinforcing element having an end portion with a convex end face the shape of which is substantially the counterpart of the face of the recess in the plunger, said reinforcing element being positioned with the axis of revolution of its end face normal to the load-bearing face of the plunger and with its end portion disposed in said recess with its end face at a spacing from the face of the recess, said reinforcing element being made of a material which is harder than the material constituting the plunger,
   (iii) an intermediate layer of material disposed in the spacing between the face of the recess of the plunger and the end face of the reinforcing element, said intermediate layer being fused to the face of the recess and to the end face of the reinforcing element, said intermediate layer being composed of a fused mixture of the materials constituting respectively the plunger and the reinforcing element.
2. A plunger assembly, as claimed in claim 1, wherein said face of said recess and said end face of said reinforcing element are both part-spherical.
3. A plunger assembly, as claimed in claim 1, wherein said reinforcing element is a cylindrical rod having its central longitudinal axis normal to the load-bearing face of the plunger.

* * * * *